United States Patent [19]

Torii et al.

[11] 4,433,394

[45] Feb. 21, 1984

[54] FIRST-IN FIRST-OUT STORAGE AND PROCESSING UNIT MAKING USE THEREOF

[75] Inventors: Shunichi Torii, Musashino; Shigeo Nagashima, Hachioji; Koichiro Omoda, Hadano, all of Japan

[73] Assignee: Hitachi, Ltd., Tokyo, Japan

[21] Appl. No.: 303,186

[22] Filed: Sep. 17, 1981

[30] Foreign Application Priority Data

Sep. 19, 1980 [JP] Japan .............................. 55-129326

[51] Int. Cl.³ .......................................... G11C 19/00
[52] U.S. Cl. .................................... 365/221; 365/78; 377/78

[58] Field of Search ................. 365/78, 189, 219, 221; 307/221 R; 328/37; 377/64, 75, 76, 77, 78

[56] References Cited

U.S. PATENT DOCUMENTS

3,898,632  8/1975  Spencer, Jr. ...................... 365/219

Primary Examiner—Joseph A. Popek
Attorney, Agent, or Firm—Antonelli, Terry & Wands

[57] ABSTRACT

A FIFO memory comprises a plurality of readable and writable data banks, a mode indicating circuit for indicating a write mode to a plurality of data banks repetitively, and a read/write control circuit for writing received data to the data bank to which the write mode has been indicated and reading the data from the data banks to which the write mode is not indicated.

15 Claims, 8 Drawing Figures

FIRST-IN FIRST-OUT STORAGE AND PROCESSING UNIT MAKING USE THEREOF

The present invention relates to a first-in first-out memory (FIFO memory) capable of reading and writing simultaneously in one memory cycle and a processing unit including the same.

A first-in first-out (FIFO) memory is defined as a memory in which information written into the memory is sequentially read out in the order the data is received, i.e., such that the first written information is read first.

In the past, memory cells of a high speed FIFO memory are formed, in many cases, of flip-flops (FF's) or latches including combination of gates, or conventional memory cells (which allow one read or write operation in each memory cycle). The former is sufficiently fast but a huge member of gates are required to construct a large capacity FIFO memory. The conventional memory cells, on the other hand, need two memory cycles for writing and reading data. The speed of such memory cells is not compatible with the presently available pipeline technique. On the other hand, it is difficult to obtain memory cells for a large capacity memory which can execute one memory cycle in one half of the pitch time of the pipeline data processor.

It is an object of the present invention to provide a FIFO memory capable of reading and writing in one memory cycle and a processing unit including the same.

The present invention is characterized by the provision of a plurality of readable and writable data banks, mode indicating means for indicating a write mode to the respective data banks and read/write control means for writing received data into the data bank to which the write mode is indicated and for reading data from the data bank to which the write mode is not indicated and for outputting the data from the banks in the same order as the data was received.

Figure 1:
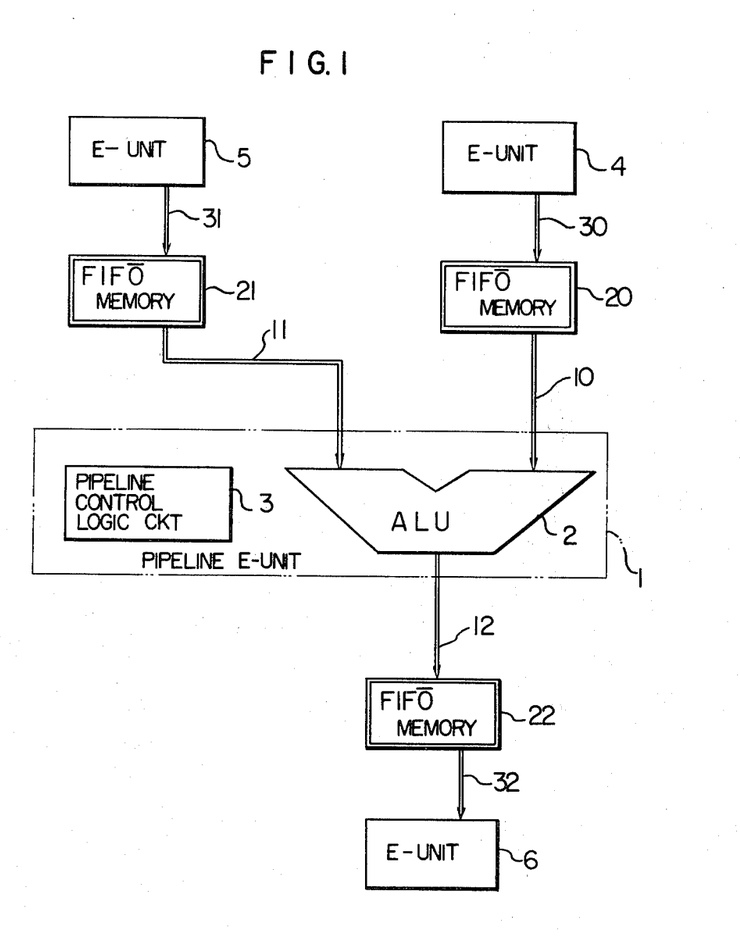
FIG. 1 shows a block diagram of pipelined data processor to which first-in first-out (FIFO) memories according to an embodiment of the present invention is to be applied.

It will be seen that FIFO memories will be effectively applied in a pipelined data processor, as shown in FIG. 1, in which a pipeline execution unit 1 encircled by a dot-and-dash line comprises a pipeline arithmetic and logic unit (ALU) 2 and a pipeline control logic circuit 3, and receives input data (single-bit or multi-bit data) from execution units (E-units) 4 and 5 through data buses 30 and 31 and sends the results of execution to another execution unit (E-unit) 6 through a data bus 32. First-in first-out (FIFO) memories 20, 21 22 are provided between the respective units as buffers for the input data and the execution results. The input data from the execution unit 4 (or the execution result of the execution unit 4) is supplied to the FIFO memory 20 through the data bus 30, thence it is supplied to the pipeline ALU 2 of the execution unit 1 through the data bus 10. The similar operations are performed for the FIFO memories 21 and 22, in which case the data buses 11 and 12 are used.

The reasons for using such FIFO memories as buffers are explained below:

(1) Compensation for the intermittence of the input data from the execution units 4 and 5. A plurality of input data pairs are successively supplied to the unit 1 from the units 4 and 5. A pair of input data items to be executed by the ALU 2 are usually to be applied simultaneously to the pipeline ALU 2. Let us assume a case where one item of an input data pair has arrived at the ALU 2 from the execution unit 4 but the arrival of the other item of the input data pair from the execution unit 5 is delayed for some reason. The FIFO memory 20 is used to delay sending the one item of the input data pair sent from the execution unit 4 to the unit 1 until the other item of the input data pair from the unit 5 arrives at the FIFO memory 21 while the FIFO memory 20 is receiving successive data sent in each cycle through the data bus 30. During this period, invalid data is supplied to the pipeline ALU 2 from the FIFO memories 20 and 21 and the execution result by the ALU 2 is also invalid. The pipeline control logic circuit 3 controls the ALU 2 so that a forwarding of the invalid output to the unit 6 is prevented.

(2) Countermeasures for rejecting the acceptance by the unit 6. The unit 6 sometimes rejects acceptance of the data from the data bus 32. The FIFO memory 22 is used to temporarily buffer the execution result from the pipeline ALU 2 through the data bus 12 and to suspend the data until the acceptance by the unit 6 is allowed.

Thus, when the intermittence of the data occurs, it is effective to use the FIFO memory between the units having the pipeline ALU's. The functions required for the FIFO memories are:

(A) Ability of simultaneous read and write within a pipeline pitch time; and (B) Ability to read the written data in a short time.

Figure 2:
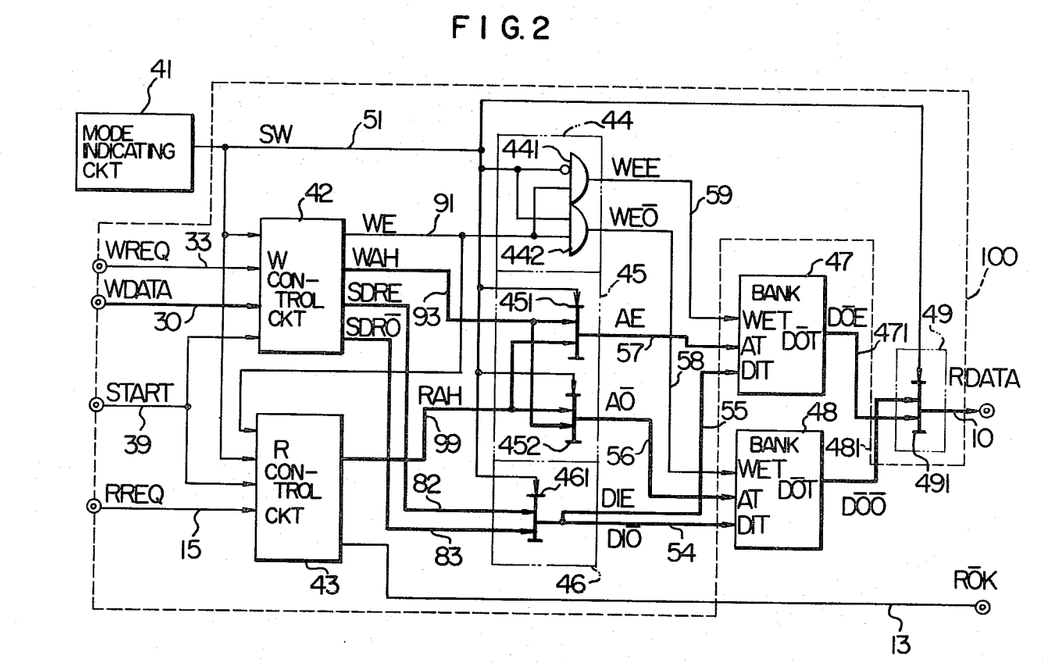
FIG. 2 shows a block diagram of the FIFO memory in accordance with one embodiment of the present invention.

Referring now to FIG. 2, a block diagram of a FIFO memory in accordance with one embodiment of the present invention is shown. The present FIFO memory may be applied to any one of the FIFO memories 20, 21 and 22 shown in FIG. 1.

In FIG. 2, numerals 47 and 48 denote data banks (hereinafter simply referred to as banks) which can read and write data independently from each other. The data banks 47 and 48 each comprises a random access memory (RAM). At least two banks are needed to satisfy the objects of this invention; although, the two banks may form part of a single memory.

It will be understood as well that a bank may comprise more than one RAM depending on the memory capacity required and the selected word configuration.

Data sent from the outside is written into the banks 47 and 48 in the order sent. For example, the data of number 0 first is written into the bank 47, the data of number 1 next is written into the bank 48, the data of number 2 next is written into the bank 47, the data of number 3 next is written into the bank 48, and so on so that the data is repetitively and alternately written into the banks 47 and 48. Thus, the data of numbers 0, 2, 4, . . . 2n (where n is an integer) i.e., the even numbered data, is sequentially written into the bank 47 and hence the bank 47 is called an even bank. On the other hand, the data of the numbers 1, 3, 5, . . . 2n+1 or the odd numbered data, is sequentially written into the bank 48 and hence the bank 48 is called an odd bank.

Numeral 41 denotes a mode indicating circuit for repetitively indicating at a constant interval a write mode to the bank 47 or 48. The write mode is called a W mode while the read mode is called an R mode. The mode indicating circuit 41 repetitively produces "0" and "1" at a constant interval such as "0", "1", "0", "1", . . . . When the output of the mode indicating circuit 41 is "0", the even bank 47 is controlled to assume the W mode and the odd bank 48 is controlled to assume the R mode. When the output of the circuit 41 is "1", the even bank 47 assumes the R mode and the odd bank 48 assumes the W mode. Accordingly, the banks 47 and 48 are controlled by the mode indicating circuit 41 to assume the R mode and the W mode repetitively and alternately at the constant interval with the banks 47 and 48 assuming different modes from each other at a given time.

Numeral 100 denotes a read/write control circuit for the banks 47 and 48, which comprises circuits 42 to 46 and 49.

The general operation of the FIFO memory is explained first. When the even numbered data is applied from the external and the even bank 47 is in the W mode, the circuit 100 immediately writes the data into the even bank 47. If the even bank 47 is in the R mode, the circuit 100 waits until the even bank 47 assumes the W mode, and then writes the data into the even bank 47 which has now assumed the W mode. The same is true for the write operation of the odd numbered data.

When a read request is issued and the data to be read next is stored in the even bank 47 and if the even bank 47 is in the R mode, the circuit 100 immediately reads the data from the even bank 47. If the even bank 47 is in the W mode, the circuit 100 waits until the even bank 47 assumes the R mode, and then reads the data from the even bank 47 which has now assumed the R mode.

The FIFO memory shown in FIG. 2 enables the simultaneous read and write. For example, it is possible to write the data into the even bank 47 simultaneously with reading the data from the odd bank 48. In FIG. 2, thick signal lines indicate signal lines each having a plurality of lines for parallel signal transmission.

The operation of the FIFO memory is now explained in more detail.

Referring to FIG. 2, when a write operation is required, a write request indication signal WREQ on a signal line 33 is set to "1". A data signal WDATA on a data line 30 represents the data to be written. The signals WREQ and WDATA are supplied from a first external unit, for example, the execution unit 4 (FIG. 1), to a write control circuit (W control circuit) 42. The W control circuit 42 includes means responsive to the signal WREQ to receive the write data signal WDATA, and detect the number (arrival number) of the write request received. Let us assume that the arrival number of the write request is N. Depending on whether W is even or odd (i.e. on the even/odd state of N), the even bank 47 or odd bank 48 is selected as the data bank into which the received data is written. On the other hand the output signal SW of the mode indicating circuit 41 indicates the W mode to the bank. When the data bank determined on the basis of the even/odd state of N and the data bank to which the W mode is indicated by the signal SW are identical, W control circuit 42 sends an address signal WAH determined by higher order bits excluding the least significant bit in the binary expression of N to signal line 93, changes a write enable signal WE on the signal line 93 to "1", sends the write data WDATA as a signal SDRE to line 82 if the data is to be written into the even bank 47 and sends the write data WDATA as a signal SDRŌ to line 83 if the data is to be written into the odd bank 48. If the coincidence of the banks determined by N and the signal SW respectively is not met when the write request WREQ arrives, means is necessary for storing the write request WREQ and the write data WDATA until the coincidence of the banks is met. An embodiment of such means will be described later in conjunction with FIG. 4. The W control circuit 42 is initialized in a manner to be described later by an initializing signal START supplied through a signal line 39.

A circuit 44 encircled by a dot-and-dash line is a write signal generating circuit which is responsive to the write enable signal WE and the mode indicating signal SW to supply a write enable signal WEE to the even bank 47 through line 59 or a write enable signal WEŌ to the odd bank 48, through signal line 58. An AND gate 441 of the circuit 44 supplies write enable signal WEE to the even bank 47 only when the signal SW is "0" and the signal WE is "1". In this manner, when the even bank 47 is in the W mode (the signal SW is "0") and the data to be written is present (the signal WE is "1"), the write enable signal WEE is supplied to the even bank 47. An AND gate 442 supplies the write indicating signal WEO to the odd bank 48 only when the signal SW is "1" and the signal WE is "1". Thus, when the odd bank 48 is in the W mode (the signal SW is "1") and the data to be written next is present (the signal WE is "1"), the write enable signal WEŌ is supplied to the odd bank 48. A circle at one of the inputs of the AND gate 441 represents an inverting function for the input signal.

A selection circuit 45 responds to the mode indicating signal SW to selectively supply the write address signal WAH to the bank 47 or 48. The circuit 45 comprises selectors 451 and 452. When the mode indicating signal SW is "0", the selector 451 selects the write address signal WAH from the group of the signal WAH on line 93 and a read address signal RAH on line 99 to be described later and supplies the signal as a memory address AE to a signal line 57. Accordingly, when the even bank 47 is in the W mode (the signal SW is "0"), the write address WAH is supplied to the even bank 47. When the signal SW is "1", the selector 451 selects the read address RAH on line 99 and supplies it as the memory address AE to the even bank 47 by way of line 57. When the signal SW is "0", the selector 452 selects the read address RAH on line 99 and supplies it as a memory address AŌ to a signal line 56, and when the signal SW is "1", the selector 452 selects the write address WAH on line 93 and supplies it as the memory address AO to the signal line 56. Accordingly, when the odd bank 48 is in the W mode (the signal SW is "1"), the write address WAH is supplied to the odd bank 48. The selectors 451 and 452 and selectors 461 and 491 to be described later have each a function to select an input from a left top part (an input from an address line 93 for the selector 451) when the signal SW from a top part thereof is "0" and select an input from a left bottom part (an input from an address line 99 for the selector 451) when the signal SW is "1" and produce the selected signal at a righthand output line (a signal line 57 for the selector 451).

A selection circuit 46 comprises a selector 461 which responds to the signal SW to select the even bank write data signal SDRE or the odd bank write data signal $\overline{SDRO}$. The selector 461 selects a signal line 82 when the signal SW is "0" and supplies the data signal SDRE to the signal line 54 as a data signal $DI\overline{O}$ and to the signal line 55 as a data signal DIE. When the signal SW is "1", the selector 461 selects a signal line 83 and supplies the data signal $\overline{SDRO}$ to the signal line as the data signal $DI\overline{O}$ and the signal line as the data signal DIE. Accordingly, when the even bank 47 is in the W mode (the signal SW is "0"), the even bank write data signal SDRE is supplied to the banks 47 and 48.

Accordingly, if an even numbered write request arrives at the $\overline{FIFO}$ memory and the even bank 47 is in the W mode at that time, the write enable signal WEE is applied to a write terminal WET of the even bank 47, the write address signal WAH is applied to an address terminal AT and the data signal SDRE is applied to a data input terminal DIT so that the even bank write data signal SDRE is written into the even bank 47. When the even bank 47 is in the W mode (the signal SW is "0"), the odd bank 48 is in the R mode and the write enable signal $\overline{WEO}$ from the output of the AND gate 442 is "0". Accordingly, the writing into the odd bank 48 is inhibited and hence the even bank write data SDRE is not written into the odd bank 48.

When the odd bank 48 is in the W mode (the signal SW is "1"), the odd bank write data signal $\overline{SDRO}$ in supplied to the banks 47 and 48. However, the data signal $\overline{SDRO}$ is not written into the even bank 47 for the same reason as described above and the data signal $\overline{SDRO}$ is written into only the odd bank 48.

Instead of using the selector 461, the signal line 82 may be connected to the signal line 55 so that the signal SDRE is always supplied to the even bank 47 and the signal line 83 may be connected to the signal line 54 so that the signal $\overline{SDRO}$ is always supplied to the odd bank 48. When the selector 461 is used, the signal lines 55 and 54 can be shared and the writing of the signal lines between the banks 47 and 48, and the W control circuit 42 can be simplified.

In this manner, the data is automatically, repetitively and alternately written into the banks 47 and 48 in the order as received, without necessity of externally specifing the address, such that the data of number 0 is written in the address 0 of the even bank 47, the data of number 1 is written in the address 0 of the odd bank 48, the data of number 2 is written into the address 1 of the even bank 47, the data of number 3 is written into the address 1 of the odd bank 48 and so on.

The banks 47 and 48 have the following input/output terminals. The terminal WET is the write enable signal input terminal to which the write enable signal WEE for the even bank 47 or the write enable signal $\overline{WEO}$ for the odd bank 48 is applied. The terminal AT is the memory address input terminal to which the memory address AE for the even bank 47 or the memory address $\overline{AO}$ for the odd bank 48 is applied. The terminal DIT is the write data input terminal to which the data signal DIE or $DI\overline{O}$ is applied.

A terminal $D\overline{OT}$ is a read data output terminal. The read data $D\overline{OE}$ is supplied from the terminal $D\overline{OT}$ of the even bank 47 to a data line 471 while the read data $D\overline{OO}$ is supplied from the terminal $D\overline{OT}$ of the odd bank 48 to a data line 481. When the input to the terminal WET is "1", the banks 47 and 48 store the data arriving at the data terminal DIT to the addresses specified by the address signal applied to the address input terminal AT. When the input to the terminal WET is "0", the banks 47 and 48 read the data stored at the addresses specified by the address signal applied to the address input terminal AT. Other input/output terminals of the banks 47 and 48 which are not shown in FIG. 2 include power supply terminals, chip select terminals and output enable terminals.

The write operation has been explained thus far. The read operation is now explained.

The read control circuit (R control circuit) 43 is initialized in a manner to be described later by the external initializing signal START. The R control circuit 43 internally generates a read address signal RA for the addresses of the banks 47 and 48 to be read, as will be explained later. The read address RA is incremented by one when a read request signal RREQ to be explained later is received. A read address signal RAH which is determined by the higher order bits excluding the least significant bit of the binary expression of the address RA, is supplied from the R control circuit 43 to the signal line 99. The circuit 43 also internally generates a number M which is the total number of written data items which have not been read. The number M is incremented by one whenever the write enable signal WE assumes "1", that is, each time when one data item is written, and decremented by one whenever the read request signal RREQ assumes "1", that is, each time when one data item is read. The signal RREQ is supplied through the line 15 from a second external unit, for example, the pipeline execution unit 1 (FIG. 1) which receives the read enable signal $R\overline{OK}$ through the signal line 13. Only when M is no less than one (that is, unread data is still stored in the banks 47 and 48) and the data is stored in the bank to which the mode indicating signal SW indicates the R mode is the $R\overline{OK}$ signal supplied to the external unit from the R control circuit 43 through the signal line 13. Whether the data is stored in the bank 47 or the bank 48 is detected by the least significant bit of the binary represented read address RA.

The read address signal RAH on the signal line 99 is supplied to the selectors 451 and 452, thence it is applied to the address terminal AT of the bank 47 or 48 depending on whether the mode indicating signal SW is "1" or "0", respectively. When the signal SW is "0", the odd bank 48 is in the R mode and the read address signal RAH is supplied to the odd bank 48 through the selector 452. When the signal SW is "1", the even bank 47 is in the R mode and the read address signal RAH is supplied to the even bank 47 through the selector 451. In this manner the read address signal RAH is supplied to the bank which is in the R mode.

As a result, the data to be read is read from the address specified by the read address signal RAH, of the bank which is in the R mode and supplied to the output terminal $D\overline{OT}$.

A selection circuit 49 which comprises a selector 491 selectively supplies the output of the bank which is in the R mode to the signal line 10. When the mode indicating signal SW is "0", the odd bank 48 is in the R mode and the selector 491 selects the data signal $D\overline{OO}$ read from the odd bank 48 and supplies it to the signal line 10. This signal is sent to the external unit as a read data signal RDATA. When the mode indicating signal SW is "1", the even bank 47 is in the R mode and the selector 491 selects the data signal $\overline{DOE}$ read from the even bank 47 and supplies it to the second external unit via the signal line 10. It should be understood that where wired OR's can be used at the output terminals $\overline{DOT}$ of the banks 47 and 48, the function of the selector 491 can be attained by connecting the data line 471 with the data line 481 and controlling the chip select terminals (not shown) and the output enable terminals (not shown) of the banks 47 and 48.

The second external unit, for example, the pipeline execution unit 1 receives the signal RDATA when the signal $\overline{ROK}$ is "1" and the unit is ready to receive the signal RDATA, and supplies the RREQ signal to the R control circuit 43 to indicate the receipt of the read data. When the signal RREQ is "1", the R control circuit 43 increments the read address RA by one in the next cycle.

In this manner, the data written into the banks 47 and 48 is read in the order as written with the first written data being read first such that the data at the address O of the even bank 47 is read first, the data at the address O of the odd bank 48 is read next, the data at the address 1 of the even bank 47 is read next, the data at the address 1 of the odd bank 48 is read next and so on. Thus, the memory shown in FIG. 2 has a first-in first-out memory function. As described above, since the mode is indicated to the banks independently, it is possible to write the data to the even bank 47 simultaneously with reading the data from the odd bank 48, and read the data from the even bank 47 simultaneously with writing the data to the odd bank 48. Thus, the simultaneous read and write operations can be carried out.

When the circuit of FIG. 1 uses the $\overline{FIFO}$ memory of FIG. 2 as the memories 20 to 22, it is necessary to synchronize the signals SW of the two $\overline{FIFO}$ memories 20 and 21. The reason therefor is explained below. In the pipeline ALU 2, it must be ascertained that the sequential numbers of the two input data provided thereto are equal. If the signals SW of the $\overline{FIFO}$ memories 20 and 21 are different in phase, however, it is not possible to read a pair of data items which have the same sequential number simultaneously from the two $\overline{FIFO}$ memories 20 and 21. To avoid the above problem, the system may be constructed such that the signals SW of all the $\overline{FIFO}$ memories in the system are always in phase. For example, the signal SW of the $\overline{FIFO}$ memory 20 may be shared by the $\overline{FIFO}$ memory 21. In FIG. 2, since the input to the execution unit 6 is only supplied from the $\overline{FIFO}$ memory 22, the synchronization of the signal SW is not necessary for the $\overline{FIFO}$ memory 22.

Figure 3A:
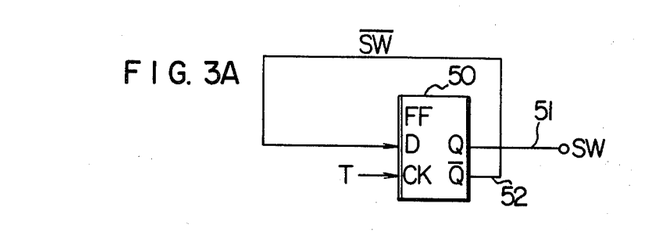
FIG. 3A shows a circuit diagram of an exemplary mode indicating circuit for indicating an operation mode of a bank.
Figure 4:
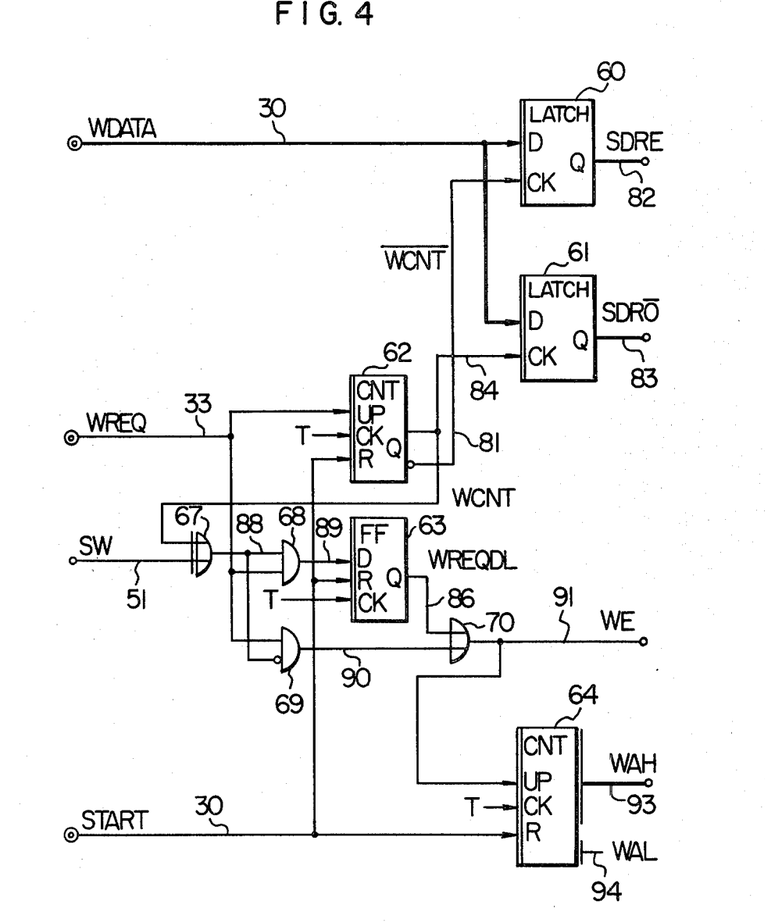
FIG. 4 shows a circuit diagram of an exemplary write (W)-control circuit for controlling writing to the bank.
Figure 5:
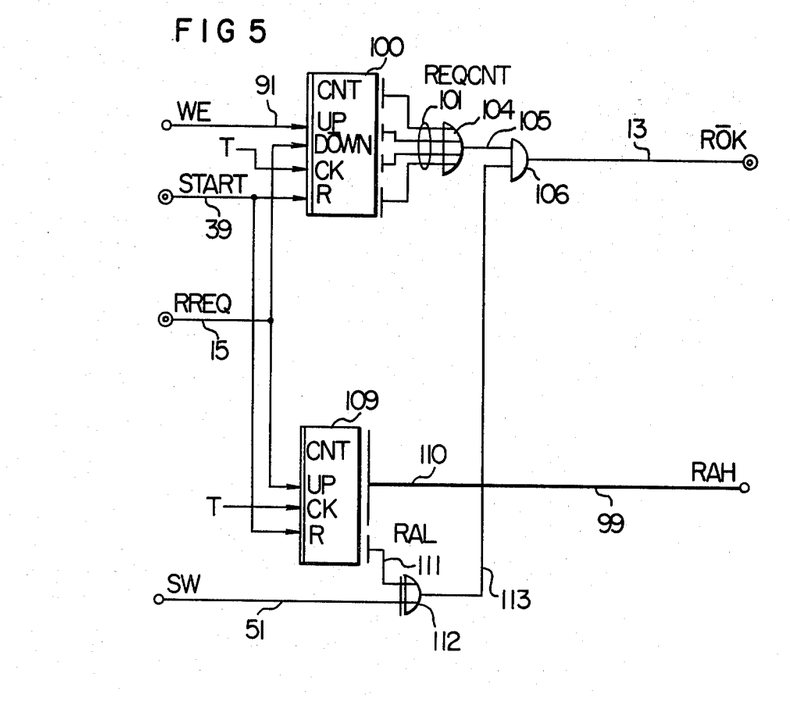
FIG. 5 shows a circuit diagram of an exemplary read (R)-control circuit for controlling reading from the bank.

Referring to FIGS. 3A, 4 and 5, the mode specifying circuit 41, the W control circuit 42 and the R control circuit 43 will be explained in further detail.

The circuits 41, 42 and 43 ae clocked by a single phase clock signal T having a clock period which is equal to the pipeline pitch of ALU as well as to a memory cycle time of the banks 47 and 48. As shown by encircled numeral at the bottom of FIG. 6, the cycles are numbered 0 to 13. Each cycle starts from a rise of the signal T and ends at the next rise of the signal T.

Unless otherwise specified, flip-flops (FF) and synchronous counters (CNT) are of edge-trigger-type which are triggered by the rise of the clock input signal T.

In FIGS. 2 to 5, single circles at terminals of signal lines indicate interface signals terminals within the $\overline{FIFO}$ memories, and double circles indicate interface signals terminals with the external of the $\overline{FIFO}$ memories.

It is now assumed that the $\overline{FIFO}$ memories each can store up to eight input data. Under this assumption, the banks 47 and 48 each may have a memory capacity of four data. The signal line 93 for the signal WAH, the signal line 99 for the signal RAH, the signal line 57 for the signal AE and the signal line 56 for the signal $\overline{AO}$ each may have a two-bit width.

All of the circuits 41, 42 and 43 shown in FIGS. 3A to 5 are synchronous circuits synchronized to the clock signal T. In the following explanation, the following two assumptions are mode: (1) The delay time of gates and the delay time of FF's and the CNT are sufficiently short relative to the cycle time of the clock signal T. (2) When the output of the FF or CNT clocked by the clock signal T is applied to the FF or CNT of the succeeding stage clocked by the same clock signal T, the FF or CNT of the succeeding stage does not mulfunction.

The assumption (2) means that a content of the FF of the preceding stage in one cycle determines a content of the FF of the succeeding stage in the next cycle, and the content of the FF of the preceding stage does not affect to the content of the FF of the succeeding stage in one cycle. When the assumption (1) is not met, the calculation and consideration of the delay times including the delay time of the banks used are necessary, and when the assumption (2) is not met, a two-phase clock signal is necessary as is well known in the synchronous circuit.

Figure 6:
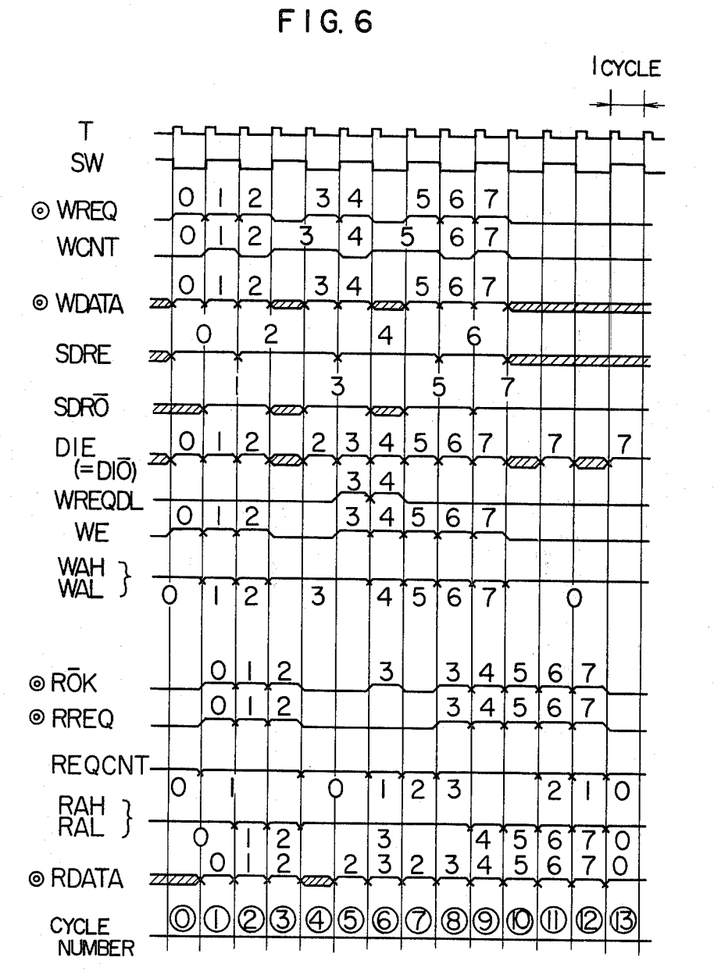
FIG. 6 shows a time chart for explaining the operation of the FIFO memory.

FIG. 3A shows a circuit diagram of the mode indicating circuit 41. An output at an inverting output terminal $\overline{Q}$ of a FF 50 is applied to an input terminal D thereof. The clock signal T which assumes "1" once in each memory cycle or pipeline pitch is applied to a clock terminal CK of the FF 50. A signal from non-inverted output terminal Q of the FF 50 is the mode indicating signal SW. Let us assume that the status of the FF 50 is "1" state. Thus, the "0" output at the terminal $\overline{Q}$ is applied to the input terminal D. At a first rise of the clock signal T, the FF 50 responds to the "0" output of the terminal $\overline{Q}$ and the status of the FF 50 changes from "1" to "0" states. Accordingly, the output at the terminal Q changes from "0" to "1", and hence the input at the input terminal D also changes to "1". At a second rise of the clock signal T, the FF 50 responds to the "1" input at the terminal D and the status of the FF 50 returns to "1" state. In this manner, the status of the FF 50 repetitively flips between "0" and "1" states at the rises of the clock signal T. Accordingly, the signal SW provided from the output terminal Q of the FF 50 also repetitively flips between "0" and "1" in response to the rise of the clock signal T as shown in FIG. 6. The signal SW functions to indicates the operation mode of the banks, as described before.

Figure 3B:
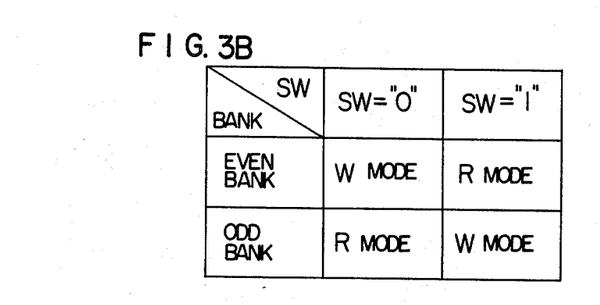
FIG. 3B is a table illustrating modes of banks indicated by a mode indicating signal SW.

FIG. 3B indicates the modes of the even bank 47 and the odd bank 48 indicated by the mode indicating signal SW.

The mode indicating circuit may;
(1) be one common a plurality of $\overline{FIFO}$ memories so that it is shared by them for synchronism with each other, or
(2) further include a circuit for altering the signal SW upon each processing of a read request so that the bank to be read next can always be selected when a possibility of competition between the read operation and the write operation has disappeared after all of the eight write data arrived, or (3) further include a circuit for altering the signal SW upon each processing of a write request so that the even/odd state of the arriving data always coincides with the even/odd state of the bank to be indicated in the W mode under a non-competing condition of the read operation and the write operation.

FIG. 4 shows a circuit diagram of the W control circuit 42. The functions of CNT's and a FF of FIG. 4 and the functions of major gates are first explained and then the operation will be explained with reference to the time chart shown in FIG. 6. A CNT 62 is an edge-trigger-type synchronous counter having a one-bit output. A CNT 64 is an edge-trigger-type 3-bit synchronous counter. A terminal UP is a count-up indicating input terminal, a terminal R is a reset terminal for clearing the content, a terminal CK is an input terminal for the clock signal T and a terminal Q is an output terminal for the counter content. The count-up operation is carried out when the input signal at the terminal UP is "1" and the clock signal T applied to the terminal CK rises from "0" to "1". When the input signal at the terminal UP is "0", the content of the CNT does not change. A FF 63 is an edge-trigger-type FF and an output at an output terminal Q changes at a rise of the clock signal applied to a terminal CK, as does the counter 62 or 64.

The CNT 62 is reset by the external signal START and counts up at the end of the cycle (the rise of the clock signal T) in which the external write request signal WREQ arrives. The output WCNT of the CNT 62 indicates whether the write request (the write request signal WREQ and the write data signal WDATA) arriving in the cycle is to the odd bank 48 or to the even bank 47. When the WCNT output is "0", it indicates that the write request is present to the even bank 47 and when the WCNT output is "1", it indicates that the write request is present to the odd bank 48. Another output signal $\overline{WCNT}$ of the CNT 62 is of opposite polarity to the output signal WCNT.

The CNT 64 is reset by the external signal START and counts up at the end of the cycle in which the data is written into either one of the banks (that is, the cycle in which the signal WE is "1"). The output of the CNT 64 is the signal WA and the higher two bits output WAH thereof indicates the write address of the bank and the least significant bit output WAL thereof indicate the even-odd state of the write bank or whether the write bank is an even bank or not. If the output WA of the CNT 64 is "$000_2$" (where the subscript 2 indicates a binary notation), the W control circuit 42 indicates the address $00_2$ of the even bank 47 as the write address. When the output of the CNT 64 is "$001_2$", the address $00_2$ of the odd bank 48 is indicated, and when the output WA is "$010_2$", the address "$01_2$" of the even bank 47 is indicated. In order to carry out the write operation to the bank, the write enable signal WE must be "1".

If the signal WREQ is "1" in a certain cycle, the data signal to be written is the signal WDATA in that cycle. The paired signals WREQ and the WDATA must arrive at the W control circuit 42 in the same cycle.

As shown in FIG. 3B, one of the even bank 47 and the odd bank 48 is indicated in the W mode depending on the value of the signal SW in the cycle. On the other hand, the write request arriving to the W control circuit 42 from the external unit arrives independently of the value of the signal SW. Accordingly, the W control circuit 42 carries out either one of the following two write procedures to each of successively arriving write requests WREQ's.

(a) The data is written into the bank in the same cycle as the cycle of the arrival of the request. When a request WREQ has arrived and the even/odd state of the sequential number of the request arrived (that is, whether or not write data is for the even bank) coincides with the even odd state of the bank which is in the W mode in the cycle in which the request has arrived, the write procedure (a) is carried out. Hereinafter, it is called an immediate write procedure.

(b) The data is written into the bank in the cycle next to the cycle in which the request has arrived. When a request has arrived and the even odd state of the number of the request arrived does not coincide with even odd state of the bank which is in the W mode in the cycle in which the request has arrived, the write procedure (b) is carried out. Hereinafter it is called a delayed write procedure.

An exclusive-OR (EOR) gate 67 shown in FIG. 4 detects the incoincidence of the even/odd states of the arriving request and the W mode bank. The EOR gate 67 is provided with the signals SW and WCNT and provides "1" only when these signals have different values. If the output of the EOR gate 67 on the signal line 88 is "0" in a certain cycle, the even/odd states thereof coincide so that the immediate write procedure is to be carried out when the request WREQ arrives. If the output of the EOR gate 67 is "1", the even/odd states do not coincide and hence the delayed write procedure is to be carried out when the request WREQ arrives. AND gates 67 and 68 detect the executions of the immediate write procedure and the delayed write procedure, respectively. A circle at one of the input terminals of the AND gate 69 indicates an inverting function of the input signal thereto as is the case of the AND gate 441 shown in FIG. 2. The necessary and sufficient condition for the "1" output of the AND gate 69 is that the signal WREQ on the signal line 33 is "1" and the signal on the signal line 88 is "0".

If the output of the AND gate 69 on the signal line 90 is "1", the write enable signal WE on the signal line 91 is rendered to be "1" via an OR gate 70 so that the data is written into the bank in the cycle in which the write request has arrived. This is the execution of the immediate write procedure.

If the output of the AND gate 68 on the signal line 89 is "1", the "1" signal is applied to the terminal D of the FF 63, and in the next cycle the output signal WREQDL of the FF 63 on the signal line 86 assumes "1" and the signal WE assumes "1" via the OR gate 70 so that the data is written into the bank in the cycle next to the cycle in which the write request WREQ has arrived. This is the execution of the delayed write procedure. Thus, the FF 63 stores the arrival of the write request WREQ which should be executed in the delayed write procedure and instructs the write operation to the bank in the next cycle.

When the signal WE is "1", the data is written into the even bank 47 or the odd bank 48. The even/odd state of the write bank can be determined either by the signal SW or by the signal WAL. As described above, in the embodiment of FIG. 2, the signal SW is used as the odd/even selection signal for the write-to bank.

The write request signal WREQ is conveyed as the signal WE in the cycle in which the write request WREQ has arrived at the W control circuit 42 in the immediate write procedure and, it is temporarily stored and conveyed as the signal WE in the next cycle in the delayed write procedure. The write data signal WDATA must be also immediately used or stored until the next cycle in the former or latter procedure, respectively. The operations for the both cases for the signal WDATA can be attained by two AND gates (corresponding to the AND gates 68 and 69), a FF (corresponding to the FF 63) and an OR gate (corresponding to the OR gate 70), as is done for the signal WREQ. However, FIG. 4 shows another approach using two latches 60 and 61.

Latches 60 and 61 operate differently from the edge-trigger-type FF. When the clock signal at an input terminal CK is "1", an input content at an input terminal D is directly produced as an output as an output terminal Q, and an input content at an input terminal D is held (or latched) even when the clock signal falls from "1" to "0", and the latched content is produced at the output terminal Q until the clock signal again rises from "0" to "1".

The latch 60 is used to temporarily hold the even numbered write data (the write data to the even bank 47) while the latch 61 is used to temporarily hold the odd numbered write data (the write data to the odd bank 48). In a cycle in which the even numbered write data arrives, the signal $\overline{WCNT}$ which is provided to the clock input CK of the latch 60 is "1" and the output signal SDRE of the latch 60 produces the content of the signal WDATA at that time that is, the latch 60 stores an even numbered write data. At the transition to the next cycle, the signal $\overline{WCNT}$ falls from "1" to "0" and the content of the signal WDATA is held so that the content of the signal SDRE in the next cycle is same as that in the previous cycle. Thus, whether the data is written into the even bank 47 in the cycle in which the even numbered write request arrives or in the cycle next to the arrival cycle, the content of the signal SDRE is the content of the correct even numbered write data for these writing.

The latch 61 and the output signal SDRO thereof are similar to the latch 60 and the output signal SDRE except that the clock signal to the latch 61 is the signal WCNT. The content of the signal SDRO is the content of the correct write data to the odd bank.

The write operation of the FIFO memory 20 is now explained with reference to the time chart shown in FIG. 6. The arriving write requests are numbered from 0 to 7 and they are written into the address 0 of the even bank 47, the address 0 of the odd bank 48, the address 1 of the even bank and so on and finally into the address 3 of the odd bank.

While not shown in FIG. 6, the CNT 62 and the CNT 64 are reset to "0" by the "1" START signal prior to series of write operations due to these write requests. The FF 63 is also reset by the "1" START signal applied to the reset terminal R, indicating that the first write request is even numbered one.

In the example shown in FIG. 6, the immediate write procedure is carried out for the write requests 0 to 2, the delayed write procedure is carried out for the write requests 3 and 4, and the immediate write procedure is carried out for the write requests 5 to 7.

First, the write request 0 arrives in a cycle "0" as indicated by encircled numeral 0. The signal WREQ on the signal line 33 and the signal WDATA on the data line 30 are supplied to the W control circuit 42. The signal WREQ is "1" and the content of the signal WDATA represents the write data. In the cycle "0", the signal WCNT is still "0" and, in the example shown in FIG. 6, the signal SW is "0" indicating that the even bank is in the W mode. Accordingly, the output of the EOR gate 67 is "0", the output of the AND gate 68 is "0", the output of the AND gate 90 is "1" and the output signal WE of the OR gate 70 is "1". In cycle in which the signal WE is "1", the data is written into the bank which is specified to the W mode by the signal SW, as shown in FIG. 2. That is, the signal WEE on the signal 59 is changed to "1" by the AND gate 441 shown in FIG. 2 to indicate the write operation to the even bank 47.

The write address is explained below. After the CNT 64 of FIG. 4 has been reset by the signal START, the output of the CNT 64 remains "$00_2$" in the cycle "0" as indicated by encircled numeral 0, and the signal WAH which comprises the higher order two bits of the output of the CNT 64, that is, "$00_2$", is supplied to the address line 93. Since the signal SW is "0", the selector 451 of FIG. 2, which determines the content of the memory address signal AE to the even bank 47, selects the write address signal WAH on the address line 93 and supplies it to the address line 57. In this manner, in the cycle "0", the correct address "$00_2$" is applied to the address terminal AT of the even bank 47. The signal RAH is applied to the address terminal AT of the odd bank 48 by the selector 452, but the write operation is not carried out because the signal WEO is "0" by the function of the AND gate 442.

The write data is now explained. In FIG. 4, since the signal $\overline{WCNT}$ is "1" in the cycle "0", the latch 60 produces the signal WDATA which corresponds to the request 0 on the data line 30, as the signal SDRE on the data line 82. Since the signal SW is "0", the selector 461 of FIG. 2 supplies the signal SDRE on the data line 82 to the data line 55. Thus, in the cycle "0", the 0-th write data signal WDATA is correctly applied to the data input terminal DIT of the even bank 47.

In a cycle "1", the write request 1 arrives and the data is written into the odd bank 48 unlike the write operation in the cycle "0". Since the signal SW is "1", the signal WEE is "0" and the signal WEO is "1". The signal WAH is selected by the selector 452 and supplied as the signal AO, and the signal SDRO is selected by the selector 461 and supplied as the signal DIO. The 3-bit output of the CNT 64 of FIG. 4 changes to "$001_2$" when the cycle transits from "0" to "1" because the signal WE was "1" in the cycle "0". The output signals WCNT and $\overline{WCNT}$ of the CNT 62 are inverted to "1" and "0", respectively, in the cycle "1" because the signal WREQ was "1" in the cycle "0". The output WREQDL of the FF 63 remains "0" in the cycle "1" because the output of the AND gate 68 was "0" in the cycle "0". The content of the signal WDATA in the cycle "0" has been held in the latch 60 and it is supplied in the cycle "1" as the signal SDRE but it is not used.

In a cycle "2", the request 2 arrives and the data is written into the even bank 47. The output of the CNT 64 changes to "$010_2$" in the cycle "2" because the signal WE was "1" in the cycle "1". Accordingly, the second write request data signal WDATA is written into the address 1 of the even bank 47.

In the example shown in the time chart of FIG. 6, the write request 3 arrives not in a cycle "3" but in a cycle "4". In the cycle "4", since the arriving request is odd numbered and the odd bank 48 is not in the W mode, the write operation to the odd bank 48 for the write request 3 is executed in the next cycle "5". In FIG. 4, in the cycle "4", the signal WCNT is "1" and the signal SW is "0". The signal on the signal line 89 is changed to "1" and the signal on the signal line 88 is changed to "0" by the function of the EOR gate 67 and the AND gate 68. The FF 63 produces the "1" WREQDL signal in the cycle "5" because "1" is applied to the input signal terminal D. The bank write enable signal WE is "0" in the cycle "4" and changes to "1" in the cycle "5" to indicate the third write operation. This is the delayed write procedure described above.

The CNT 64 which generates the write address WA holds the same content "$011_2$" through the cycles "3" to "5" because the signal WE was "0" in the cycles "3" and "4". In the cycle "5", the correct memory address "$01_2$" is supplied to the odd bank 48.

The write data is explained below. In the cycle "4", the third write data signal WDATA arrives. Since the signal WCNT which clocks the latch 61 is "1" in the cycle "4" and "0" in the cycle "5", the content of the output signal SDRO of the latch 61 is identical to the content of the signal WDATA in the cycle "4" as well as the cycle "5".

Accordingly, the write data for the request 3 can be correctly supplied to the odd bank 48 in the cycle "5".

The W control circuit 42 of FIG. 4 cannot execute the write operation to the odd bank 48 for the write request 3 in the cycle "4", but can execute it in the next cycle "5". From the periodicity of the signal SW, it is predicted that if the signal SW is "0" in the cycle "4", it will be "1" in the next cycle "5".

The write request 4 also arrives in the cycle "5" in which the even bank 47 is not in the W mode and hence the data is written into the even bank 47 with one cycle delay.

The request 5 arrives in the cycle "7" in which the odd bank 48 is in the W mode so that the data is immediately written into the odd bank 48 as is done for the requests 0, 1 and 2. Thus, the immediate write procedure is carried out with the signal WREQ and the signal WE being "1" in the same cycle "7".

Each time when the data for one of the eight write requests is written into the bank, the 3-bit counter CNT 64 is counted up so that the output changes from "$000_2$" to "111". In a cycle "10", the output may return to "$000_2$" but the content at the address "$00_2$" of the even bank 47 is not destroyed because the write request 8 does not arrive from the external.

FIG. 5 shows a circuit diagram of the R control circuit 43. An edge-trigger-type counter (CNT) 100 is a reversible 4-bit counter. The count-up and count-down modes of the counter 100 are indicated by inputs to a count-up terminal UP and a count-down terminal DOWN. When the write enable signal WE provided to the terminal UP is "1" and the read request signal RREQ provided to the terminal DOWN is "0", the counter 100 counts up by one at the rise of the clock signal T applied to a clock terminal CK. When the input signal WE to the terminal UP is "0" and the input signal RREQ to the terminal DOWN is "1", the counter 100 counts down by one. When both inputs are "0" or "1", the counter 100 does not count up or count down. A 4-bit output REQCNT of the CNT 100 is supplied to a 4-bit data line 101. The content of the CNT 100 indicates the number of data which were written but have not been read. The CNT 100 is the 4-bit counter so that it can store nine different numbers 0-8 of the input data. The CNT 100 is reset by the initializing signal START applied to a reset terminal R. The 4-bit output of the CNT 100 is supplied to an OR gate 104 which OR's the respective bits and supplies the result to a signal line 105. If the output of the OR gate 104 is not "0", it indicates the presence of data which were written into the banks 47 and 48 and have not been read. A CNT 109 is a binary 3-bit counter which is reset by the initializing signal START applied to a reset terminal R and counts up at the rise of the clock signal T applied to a clock terminal CK when the input signal RREQ to a count-up terminal UP is "1".

The content of the binary 3-bit CNT 109 indicates the read address. The CNT 109 supplies the higher two bits of the content of the address line 99 as the bank read address RAH and supplies the low one bit to the signal line 111 as the signal RAL to indicate the odd even state of the bank to be read.

Numeral 112 denotes an exclusive OR (EOR) gate which determines if the bank to be read coincides with the bank indicated in the R mode by the mode indicating signal SW. When the low order bit signal RAL of the CNT 109 is "0", the even bank 47 is to be read therefrom, and when the signal SW is "1" the even bank 47 is in the R mode. When the signal RAL is "1", the odd bank 48 is to be read therefrom, and when the signal SW is "0", the odd bank 48 is in the R mode. Accordingly, the EOR gate 112 produces a "1" output when the bank to be read coincides with the bank indicated in the R mode by the mode indicating signal, and produces a "0" output otherwise. An AND gate 106 ANDs the signals on the signal lines 105 and 113. Accordingly, the read enable signal $\overline{ROK}$ from the output of the AND gate 106 is "1" only when there are data in the banks 47 and 48 which were written but have not yet been read, and the bank to be read is in the R mode. Otherwise, the signal $\overline{ROK}$ is "0". The signal ROK indicates that the FIFO memory is ready to be read, as described before.

The operation of the R control circuit is explained with reference to the time chart shown in FIG. 6.

The external circuit assures that the read request signal RREQ supplied from the signal line 15 assumes "1" only when the signal ROK is "1". For example, the pipeline control logic circuit 3 of FIG. 1 assures it. The CNT's 100 and 109 are initialized to "0" by the signal START prior to a series of read operations, as is done in the W control circuit.

In the cycle "0", the write data 0 is written into the even bank 47 and the signal WE is "1" and the CNT 100 counts up at the rise of the clock signal T. In the cycle "1", the output REQCNT of the CNT 100 changes to "$0001_2$" and the OR gate 104 supplies the "1" output to the signal line 105 to indicate the presence of the unread data in the bank. On the other hand, in the cycle "1", the EOR gate 112 determines that the signal SW is "1" and the even bank 47 is in the R mode and supplies the "1" output to the signal line 113. The AND gate 106 determines that the two conditions are met and supplies the "1" ROK signal to the signal line 13.

In the example shown in FIG. 6, the external signal RREQ changes to "1" in response to the signal ROK. When the signal RREQ on the signal line 15 is "1", the CNT 109 counts up. In the cycle "1", the CNT 100 does not count because the signal WE indicating the first write is "1". In the next cycle "2", the output signal REQCNT remains at "$0001_2$" indicating the presence of one unread data. In the cycle "1", the output signal RAH which is the higher order two bits of the content of the CNT 109 is "00" and it is supplied to the selection circuit 45 of FIG. 2 via the data line 99. In the cycle "1", since the signal SW is "1", the selector 451 in the selection circuit 45 selects the signal RAH and supplies it to the address terminal AT of the even bank 47. On the other hand, since the signal SW is "1", the AND gate 441 in FIG. 2 produces the "0" WEE signal. Because the signal WEE is "0", the data is read from the bank 47 at the address "00" specified by the signal AE, and supplies the content of the data 0 written in the immediately previous cycle, to the data line 471 as the signal DOE. Since the signal SW is "1", the selector 491 in FIG. 2 selects the signal DOE and supplies it to the data line 10 as the signal RDATA. In this manner, the data 0 is supplied to the signal RDATA in the cycle "1".

The read operations for the data 1 and 2 are similar to that described above except the value of the signal SW and the odd/even state of the banks.

The data 3 is written three cycles after the completion of the writing of the data 2. As a result, in the cycle "3" in which the data 2 is read, the signal RREQ is "1" and the signal WE is "0" so that the CNT 100 counts down. In the next cycle "4", the signal REQCNT changes to "0000$_2$", the signal ROK changes to "0" and the "1" RREQ signal is not applied. Accordingly, the reading operation for the data 3 is not carried out. In the cycle "6" following to the cycle in which the signal WE changes to "1" in response to the third write request signal WREQ, the signal REQCNT changes to "0001$_2$" and the signal ROK changes to "1". In the example shown in FIG. 6, the signal RREQ remains "0" by some external cause. In the next cycle "7", the signal SW changes to "1" and the signal ROK changes to "0" because the odd bank 48 in which the data 3 is stored is not in the R mode. In this cycle, the content of the CNT 100 is "0010$_2$" deflecting the fourth writing in the immediately previous cycle. In the next cycle "8", the signal SW is "0" and the signal ROK is "1" and the signal RREQ is "1". In the cycle "8" the signal REQCNT has been increased to "0011$_2$".

The data 4 to 7 are read sequentially. In the cycle "12", the last data 7 is supplied as the signal RDATA. During thirteen cycles from the cycle "0" to the cycle "12", the eight write requests and the eight read requests are handled in the FIFO memory. During the four cycles from the cycle "6" to the cycle "9", the four write requests and the four read requests are handled parallelly, one set in each cycle, so that a maximum purformance of the FIFO memory is attained.

Figure 7:
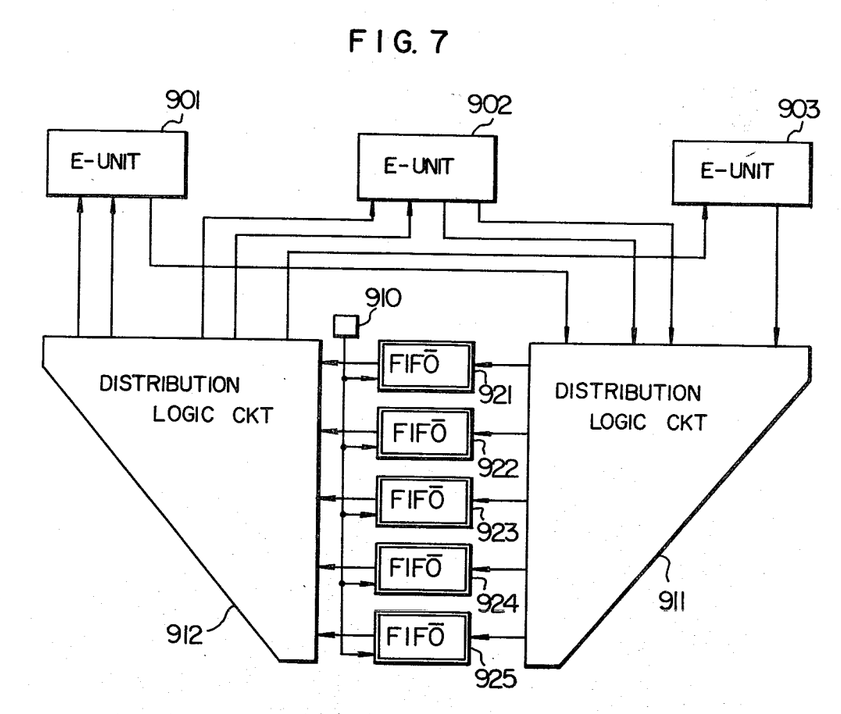
FIG. 7 shows a block diagram of a pipelined data processor embodying the FIFO memory of the present invention.

When the present invention is applied to the pipeline execution units, the FIFO memory may be fixedly combined with the execution units as shown in FIG. 1 or the combination may be dynamically altered by a programming. FIG. 7 shows an example of the latter, in which distribution logic circuits 911 and 912 are arranged between the pipeline execution units 901, 902, 903 and the FIFO memories 921, 922, 923, 924, 925. The distribution logic circuits 911 and 912 function to allocate the FIFO memories to the input ports and the output ports of the units in accordance with external instructions. The distribution logic circuits 911 and 912 each comprises a plurality of multi-input selectors which are known per se. For example, at a certain time point, the distribution logic circuit 912 may select the output of the FIFO memory 921 as the input to the unit 903 and the distribution logic circuit 911 may select the output of the unit 903 as the input to the FIFO memory 922, and at another time point, the FIFO memory 923 may be selected as the input to the unit 903 and the FIFO memory 924 may be selected as the output. The distribution logic circuit 911 and 912 may be constructed by a number of selectors.

The FIFO memories 921 and 925 do not include the FIFO memory 41 shown in FIG. 2. A memory 910 corresponds to the FIFO memory 41, and is shared by the FIFO memories 921 to 925.

The execution units shown in FIG. 7 may be ALU units which carries out addition, subtraction, multiplication and division operations or storage control units capable of storing a large volume of data.

As described hereinabove, in accordance with the FIFO memory of the present invention, the read and write operations can be simultaneousely carried out. When the write request arrives, the write data can be written into the FIFO memory without a waiting time.

What is claimed is:
1. A first-in first-out memory comprising:
   a plurality of memory banks each capable of read and write modes of operation;
   first indicating means for generating a mode indicating signal sequentially and cyclically indicating a write mode of operation for said memory banks in a predetermined order in response to a clock signal;
   write control means responsive to said mode indicating signal and sequentially received data signals for writing said sequentially received data signals into different ones of said memory banks according to said predetermined order and at the sequential timings when said write mode is indicated for said different memory banks;
   second indicating means responsive to an applied read request signal for generating a read address signal indicating an address of one of said memory banks for effecting readout of the next data signal; and
   read control means responsive to said mode indicating signal and said read address signal for reading out said next data signal from said indicated address of said one memory bank, including first means for detecting the presence of said next data signal in a memory bank in dependence on the difference between the total number of data signals already written into the memory banks and the number of data signals already read out of said memory banks and second means for reading out said next data signal when said one memory bank is not in a write mode.

2. A first-in first-out memory according to claim 1, wherein said read control means further includes third means for generating a read OK signal which indicates that the next data signal is present in a memory bank, at a timing when said write mode is not indicated to said one memory bank and the result of said detection by said first means is positive.

3. A first-in first-out memory according to claim 2, wherein said read control means further includes fourth means responsive to said read address signal and said mode indicating signal for reading data from one of said memory banks which is not enabled to operate in said write mode, said one memory bank being changed between write and read modes of operation sequentially and cyclically in response to said clock signal.

4. A first-in first-out memory according to claim 2, wherein said plurality of memory banks comprise first and second memory banks; said first indicating means comprises means for alternately enabling said first and second memory banks to operate in the write mode in response to said clock signal; and said read control means further includes means for alternately indicating one of said first and second memory banks in response to receipt of said read request signal.

5. A first-in first-out memory according to claim 4, wherein said write control means includes a binary write address counter, means for changing the value of said write address counter when either of said first and second memory banks receives a data signal, and means for applying the output of said write address counter except for the lowest order bit thereof as a write address for the next writing operation for either memory bank.

6. A first-in first-out memory according to claim 4, wherein said read control means includes means for alternately reading data from one of said first and second memory banks in response to said mode indicating signal when said one bank is not enabled to operate in said write mode.

7. A first-in first-out memory according to claim 6, wherein said means for alternately reading data comprises means for selectively transferring output data from said first and second memory banks in response to said mode indicating signal.

8. A first-in first-out memory according to claim 6, wherein said first means includes means for effecting said detection in response to said clock signal, and said generating means includes means for detecting coincidence in response to said clock signal between said one memory bank and said indicated memory bank in the write mode.

9. A first-in first-out memory comprising
even and odd memory banks for storing even and odd ones of a plurality of sequentially received data items, respectively, in response to an applied write enable signal and a memory address and for reading out stored data items in response to an applied memory address in the absence of a write enable signal;
mode indicating means for alternately generating first and second write indicating signals designating the write mode periods for said even and odd memory banks, respectively;
write control means connected to receive a write request signal and a data item for generating a write enable signal only when the received data item is to be stored in one of said memory banks which is in its write mode period as indicated by said write indicating signals;
write enabling means connected to said mode indicating means and said write control means for applying said write enable signal, said data item and a memory address to the one of said even and odd memory banks which is in its write mode period as indicated by said write indicating signals;
read control means responsive to a received read request signal for generating sequential read address signals when data items are stored in at least one of said memory banks;
read enabling means connected to said mode indicating means and said read control means for applying said read address signal to said even and odd memory banks alternately in response to said write indicating signals so that said read address signals are applied to said memory banks during times when they are not in their write mode periods; and
output means for transmitting data items read from said even and odd memory banks to an output terminal.

10. A first-in first-out memory according to claim 9, wherein said write control means includes means for detecting from said received write request signal whether the received data item is to be stored in said even or odd memory bank.

11. A first-in first-out memory according to claim 10, wherein said write control means includes means for temporarily storing the received data item when said data item is received at a time when the memory bank into which it is to be stored is not in its write mode period.

12. A first-in first-out memory according to claim 10, wherein said write control means includes means for storing a memory address signal to be applied to said write enabling means along with said write enable signal and means responsive to receipt of said write request signal for incrementing said memory address signal in said storing means.

13. A first-in first-out memory according to claim 9, wherein said read control means includes means for storing a read address signal to be applied to said read enabling means and means responsive to said read request signal for incrementing said read address signal in said storing means.

14. A first-in first-out memory according to claim 9, wherein said read control means includes means responsive to said write request signal and said read request signal for determining whether a data item remains in at least one of said memory banks to be read out.

15. A first-in first-out memory according to claim 9, including more than two memory banks, and wherein said mode indicating means operates to generate sequentially a write indicating signal for each of said memory banks.

* * * * *